US012527929B2

(12) United States Patent
Khasawneh et al.

(10) Patent No.: US 12,527,929 B2
(45) Date of Patent: Jan. 20, 2026

(54) RESPIRATORY THERAPY APPARATUS AND METHODS

(71) Applicant: SMITHS MEDICAL INTERNATIONAL LIMITED, Ashford (GB)

(72) Inventors: Mohammad Qassim Mohammad Khasawneh, Canterbury (GB); Sondre Skatter, Oakland, CA (US)

(73) Assignee: ICU Medical International Limited, Ashford (GB)

( * ) Notice: Subject to any disclaimer, the term of this patent is extended or adjusted under 35 U.S.C. 154(b) by 1020 days.

(21) Appl. No.: 17/057,175

(22) PCT Filed: Jun. 3, 2019

(86) PCT No.: PCT/GB2019/000081
§ 371 (c)(1),
(2) Date: Nov. 20, 2020

(87) PCT Pub. No.: WO2019/234380
PCT Pub. Date: Dec. 12, 2019

(65) Prior Publication Data
US 2021/0228826 A1     Jul. 29, 2021

(30) Foreign Application Priority Data
Jun. 9, 2018    (GB) ..................... 1809559

(51) Int. Cl.
*A61M 16/00*    (2006.01)
*A61M 16/20*    (2006.01)
*A63B 23/18*    (2006.01)

(52) U.S. Cl.
CPC ...... *A61M 16/0006* (2014.02); *A61M 16/208* (2013.01); *A63B 23/18* (2013.01);
(Continued)

(58) Field of Classification Search
CPC ............ A61M 16/0006; A61M 16/208; A61M 2016/0027; A61M 2205/3375;
(Continued)

(56) References Cited

U.S. PATENT DOCUMENTS 6,581,598 B1 *   6/2003   Foran ..................... A63B 23/18
                                                            128/204.19
10,881,818 B2 *  1/2021   Costella ............... A61B 5/0876
(Continued)

FOREIGN PATENT DOCUMENTS

WO       2014202823 A1      12/2014
WO    WO-2014202923 A1 *    12/2014  ........... A61B 5/4833
(Continued)

OTHER PUBLICATIONS

Definition of frequency as it relates to sound, Access from website of: https://www.nps.gov/subjects/sound/understandingsound.htm#:~:text=Frequency%2C%20sometimes%20referred%20to%20as,frequency%2C%20the%20fewer%20the%20oscillations. (Year: 2024).*

*Primary Examiner* — Rachel T Sippel
*Assistant Examiner* — Gwynneth L Howell
(74) *Attorney, Agent, or Firm* — Louis Woo (57) ABSTRACT

A vibratory respiratory therapy device (100) has a valve element (11) on a rocker arm (12) that opens and closes an opening (10) during exhalation through the device and thereby generates sound. A mobile phone (20) with a microphone (21) picks up the sound generated and has a processor (22) that converts the sound signal into a sound energy signal in order to measure its frequency. The processor (22) computes a measure of pressure in the device (10) by multiplying the detected frequency by a fixed factor and adding a fixed constant to the product. The pressure data is used to monitor patient use of the device.

12 Claims, 9 Drawing Sheets

(52) U.S. Cl.
CPC ............... *A61M 2016/0027* (2013.01); *A61M 2205/3375* (2013.01); *A61M 2205/50* (2013.01)

(58) Field of Classification Search
CPC .......... A61M 2205/50; A61M 16/0866; A61M 2205/3331; A61M 2205/3569; A61M 2205/3592; A61M 2205/505; A61M 2205/52; A61M 16/20; A63B 23/18; A61H 23/00; A61H 23/0236
See application file for complete search history.

(56) References Cited

U.S. PATENT DOCUMENTS

| | | | |
|---|---|---|---|
| 11,000,654 B2* | 5/2021 | Varney | A63B 23/18 |
| 11,154,674 B2* | 10/2021 | Richards | A61M 16/0006 |
| 11,464,924 B2* | 10/2022 | Bennett | A63B 21/0088 |
| 2005/0255874 A1* | 11/2005 | Stewart-Baxter | H04M 1/663 |
| | | | 455/550.1 |
| 2006/0090753 A1* | 5/2006 | Pelerossi | A61M 16/0006 |
| | | | 128/200.24 |
| 2006/0099556 A1* | 5/2006 | Yeo | A63B 24/0003 |
| | | | 482/8 |
| 2016/0136366 A1* | 5/2016 | Bennett | A63B 23/18 |
| | | | 128/205.23 |
| 2016/0136367 A1* | 5/2016 | Varney | A63B 23/18 |
| | | | 128/202.13 |
| 2016/0166766 A1* | 6/2016 | Schuster | G01F 22/00 |
| | | | 702/54 |
| 2016/0193436 A1* | 7/2016 | Khasawneh | A61M 16/0006 |
| | | | 128/202.16 |
| 2016/0213868 A1* | 7/2016 | Khasawneh | A61B 5/08 |
| 2016/0331917 A1* | 11/2016 | Bennett | A61M 16/0006 |
| 2017/0020776 A1* | 1/2017 | Khasawneh | A61B 5/486 |
| 2017/0228698 A1* | 8/2017 | Kohli | G06Q 10/1057 |
| 2018/0008790 A1* | 1/2018 | Costella | A61B 5/0876 |
| 2019/0094206 A1* | 3/2019 | Blomquist | A61M 16/208 |

FOREIGN PATENT DOCUMENTS

| | | | | |
|---|---|---|---|---|
| WO | WO-2014202924 A1 * | 12/2014 | ........ | A61M 16/0006 |
| WO | WO-2015008013 A1 * | 1/2015 | ........ | A61M 16/0006 |
| WO | WO-2015036723 A1 * | 3/2015 | ............... | A61B 5/08 |
| WO | WO-2015104522 A1 * | 7/2015 | ........ | A61M 16/0006 |
| WO | WO-2016079461 A1 * | 5/2016 | | |
| WO | WO-2017178776 A1 * | 10/2017 | | |

* cited by examiner

FIG. 1

Prior Art

RESPIRATORY THERAPY APPARATUS AND METHODS

This invention relates to respiratory therapy apparatus of the kind including a device arranged to provide an alternating resistance to respiratory flow through the device and a sensor unit arranged to sense sound made by the device.

Positive expiratory pressure (PEP) apparatus, that is, apparatus that presents a resistance to expiration through the device, are now widely used to help treat patients suffering from a range of respiratory impairments, such as chronic obstructive pulmonary disease, bronchitis, cystic fibrosis and atelectasis. More recently, such apparatus that provide an alternating resistance to flow have been found to be particularly effective. One example of such apparatus is sold under the trade mark Acapella (a registered trade mark of Smiths Medical) by Smiths Medical and is described in U.S. Pat. Nos. 6,581,598, 6,776,159, 7,059,324 and 7,699,054. Other vibratory respiratory therapy apparatus is available, such as "Quake" manufactured by Thayer, "AeroPEP" manufactured by Monaghan, "TheraPEP" manufactured by Smiths Medical and "IPV Percussionator" manufactured by Percussionaire Corp. Alternative apparatus such as "Cough-Assist" manufactured by Philips is also available. Respiratory therapy apparatus can instead provide an alternating resistance to flow during inhalation. WO14202923 describes apparatus that monitors the sound made by use of a therapy device and provides an indication of the frequency of operation of an oscillating valve in the apparatus.

To be effective these apparatus must be used regularly at prescribed intervals. In the case of chronic diseases, the patient needs to use the apparatus daily for the rest of his life in order to maintain a continuous relief.

Although these apparatus can be very effective, users often neglect to use the apparatus regularly at the prescribed frequency. It is very difficult to maintain a record of use of the apparatus, especially when the patient is using it at home. The clinician often does not know whether deterioration in a patient's condition is because he has failed to use the apparatus as prescribed or whether other factors are the cause. It can be useful to monitor pressure within the therapy device for the purpose of monitoring use, or in providing feedback to the patient to prompt correct use. It has previously been proposed to mount a pressure sensor in the therapy device to monitor pressure. This, however, adds to cost of what is usually a disposable device and requires electrical power within the device, which can lead to electrical safety concerns or to disposal problems where batteries are used.

It is an object of the present invention to provide alternative respiratory therapy apparatus and a method of evaluating use of a respiratory therapy device.

According to one aspect of the present invention there is provided respiratory therapy apparatus of the above-specified kind, characterised in that the sensor unit includes a processor arranged to compute a measure of pressure created in the device from a frequency of the sound.

The processor is preferably arranged to compute a measure of the pressure by multiplying the detected frequency by a fixed factor and adding to the product a fixed constant. The factor may be is about 1.119 and the constant may be about −4.659. The processor is preferably arranged to convert the sound signal into a sound energy signal and to use the sound energy signal in the computation of the measure of pressure. The sensor unit preferably includes a microphone responsive to audible sound. The device may include a valve element on a rocker arm that opens and closes an opening during exhalation through the device. The sensor unit is preferably not mounted on the device but is separate from the device. The sensor unit may be provided by a mobile phone including a microphone and a screen, the processor also being provided by the phone.

According to another aspect of the present invention there is provided a sensor unit arranged to sense sound made by a respiratory therapy device, characterised in that the sensor unit includes a processor arranged to compute a measure of pressure created in the device from a frequency of the sound.

According to a further aspect of the present invention there is provided a method of evaluating use of a respiratory therapy device of the kind arranged to produce an oscillating resistance to breathing through the device, characterised in that the method includes the steps of monitoring pressure waves transmitted through air caused by use of the device, calculating a measure of a frequency of the pressure waves and computing a measure of the pressure within the device from the measure of frequency.

The measure of the pressure may be computed by multiplying the detected frequency by a fixed factor and adding to the product a fixed constant. The factor may be about 1.119 and the constant may be about −4.659. The method preferably involves converting the sound signal into a sound energy signal and using the sound energy signal in the computation of the measure of pressure.

According to a fourth aspect of the present invention there is provided apparatus for use in a method according to the above further aspect of the present invention.

Apparatus including a vibratory PEP device will now be described, by way of example, with reference to the accompanying drawings, in which.

Figure 1:
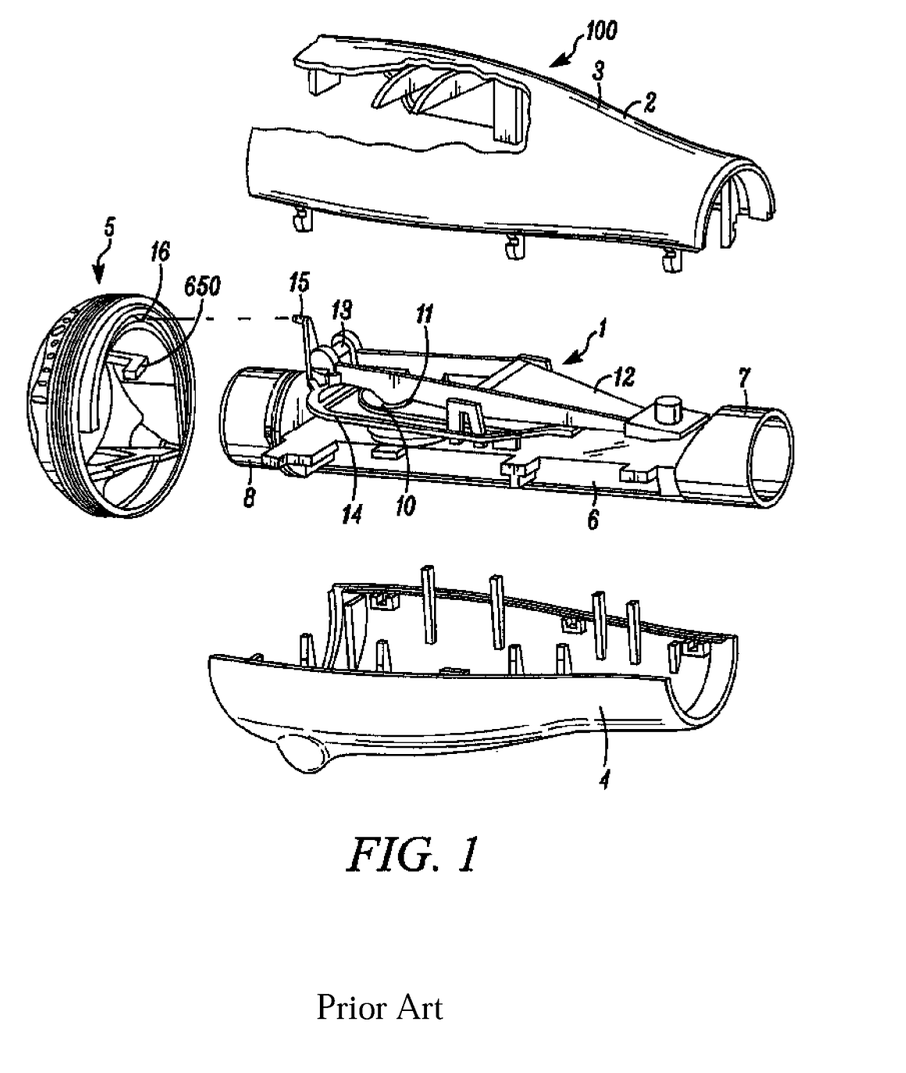
FIG. 1 is an exploded view of the apparatus.

With reference first to FIG. 1, the device 100 comprises a rocker assembly 1 contained within an outer housing 2 provided by an upper part 3 and a lower part 4 of substantially semi-cylindrical shape. The device is completed by an adjustable dial 5 of circular section. The rocker assembly 1 includes an air flow tube 6 with a breathing inlet 7 at one end and an inspiratory inlet 8 at the opposite end including a one-way valve (not shown) that allows air to flow into the air flow tube 6 but prevents air flowing out through the inspiratory inlet. The air flow tube 6 has an outlet opening 10 with a non-linear profile that is opened and closed by a conical valve element 11 mounted on a rocker arm 12 pivoted midway along its length about a transverse axis. The air flow tube 6 and housing 2 provide a structure with which the rocker arm 12 is mounted. At its far end, remote from the breathing inlet 7, the rocker arm 12 carries an iron pin 13 that interacts with the magnetic field produced by a permanent magnet (not visible) mounted on an adjustable support frame 14. The magnet arrangement is such that, when the patient is not breathing through the device, the far end of the rocker arm 12 is held down such that its valve element 11 is also held down in sealing engagement with the outlet opening 10. A cam follower projection 15 at one end of the support frame 14 locates in a cam slot 16 in the dial 5 such that, by rotating the dial, the support frame 14, with its magnet, can be moved up or down to alter the strength of the magnetic field interacting with the iron pin 13. The dial 5 enables the frequency of operation and the resistance to flow of air through the device to be adjusted for maximum therapeutic benefit to the user.

When the patient inhales through the breathing inlet 7 air is drawn through the inspiratory inlet 8 and along the air flow tube 6 to the breathing inlet. When the patient exhales, the one-way valve in the inspiratory inlet 8 closes, preventing any air flowing out along this path. Instead, the expiratory pressure is applied to the underside of the valve element 11 on the rocker arm 12 causing it to be lifted up out of the opening 10 against the magnetic attraction, thereby allowing air to flow out to atmosphere. The opening 10 has a non-linear profile, which causes the effective discharge area to increase as the far end of the rocker arm 12 lifts, thereby allowing the arm to fall back down and close the opening. As long as the user keeps applying sufficient expiratory pressure, the rocker arm 12 will rise and fall repeatedly as the opening 10 is opened and closed, causing a vibratory, alternating or oscillating resistance to expiratory breath flow through the device. This oscillating movement of the rocker arm 12 produces a rattling sound audible externally of the therapy device 2. Further information about the construction and operation of the device can be found in U.S. Pat. No. 6,581,598, the contents of which are not essential for an understanding of the present invention.

As so far described, the apparatus is conventional.

The apparatus of the present invention includes the device 100 described above and sensor means responsive to pressure waves transmitted through air and caused by use of the device. Typically the pressure waves are at acoustic frequencies, producing an audible sound that can be sensed by a conventional microphone.

Figure 2:
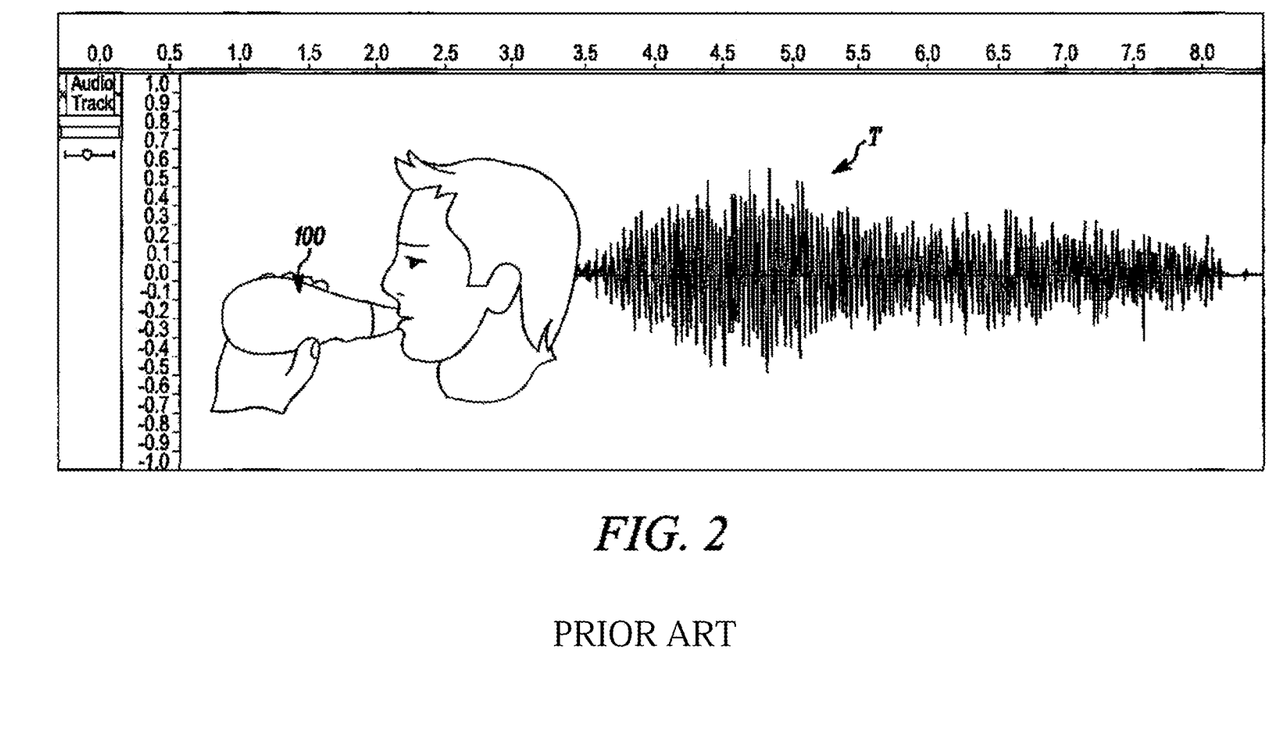
FIG. 2 illustrates the sound output produced by a single breath.

FIG. 2 illustrates the patient exhaling through the device 100 to produce the desired therapy effect. The oscillating movement of the rocker arm 12 produces an audible sound that is transmitted through the surrounding air as pressure waves. This is represented by the trace "T" of a single expiration breath shown at the right of the Figure. It can be seen that the sensed sound takes the form of rapidly alternating positive and negative peaks at a frequency dependent on the frequency of rocking of the rocker arm 12 and with a mean amplitude that rises to a maximum towards the start of the breath and then gradually tails off towards the end of the breath.

Figure 3:
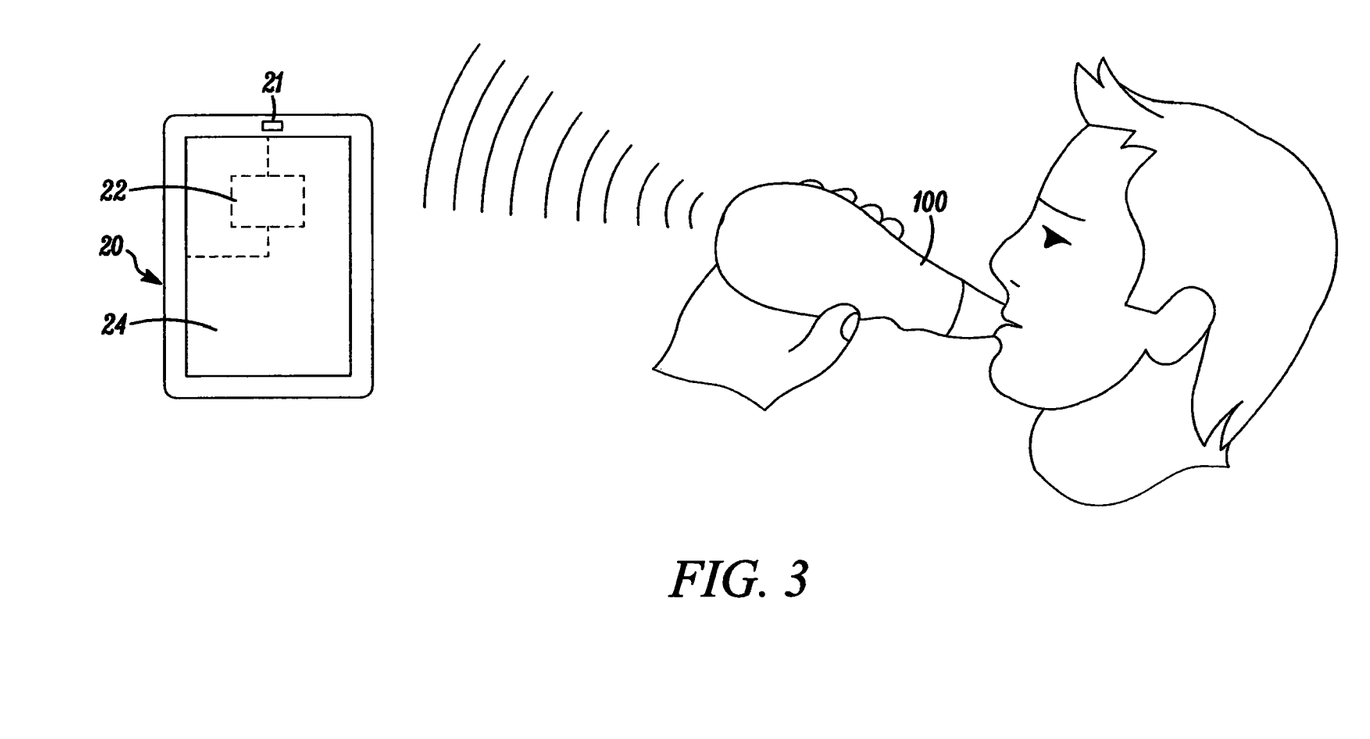
FIG. 3 illustrates the apparatus in use.

FIG. 3 shows the device 100 and sensor means in the form of a mobile phone 20 programmed with an app arranged to process the output of the microphone 21 in the phone. The phone 20 thereby provides a stand-alone acoustic sensor that is separate from the device 2 but, in use, is placed close to it. The microphone 21 in the phone 20 is connected to a processor 22 including a memory unit and provides an output to a display screen 24. The microphone 21 is responsive to sound in the audible hearing range. The app programmed in the processor 22 includes a frequency detection algorithm arranged to determine the frequency of the signal from the microphone 21.

The frequency detection algorithm is arranged to measure the fluttering frequency of the therapy device during operation is based on autocorrelation in the time domain, operating upon a filtered signal that embodies the sound energy rather than the sound amplitude. Sound energy is dependent on sound amplitude and on the frequency of the sound and has been found to give a clearer representation of wave structure.

Figure 4:
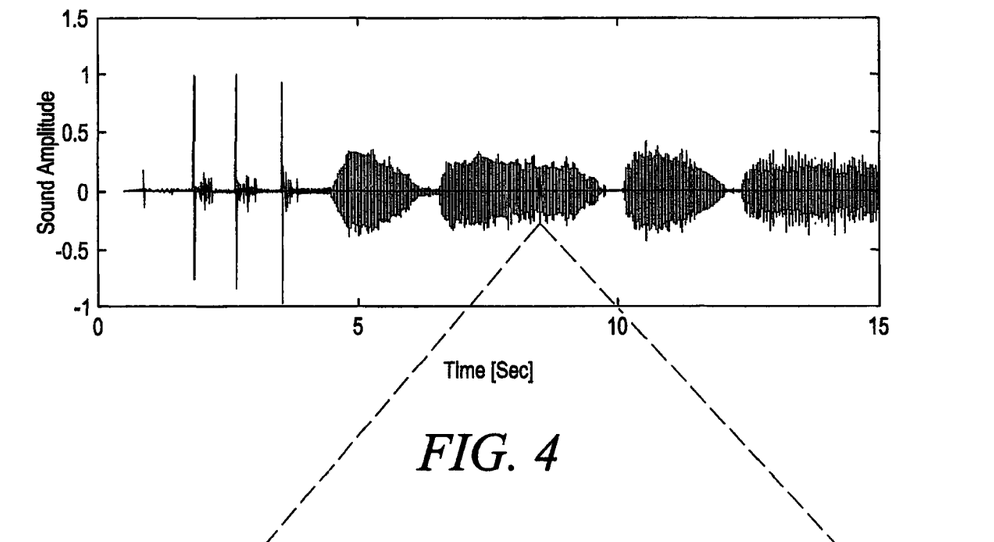
FIG. 4 is a graph of sound amplitude against time.
Figure 5:
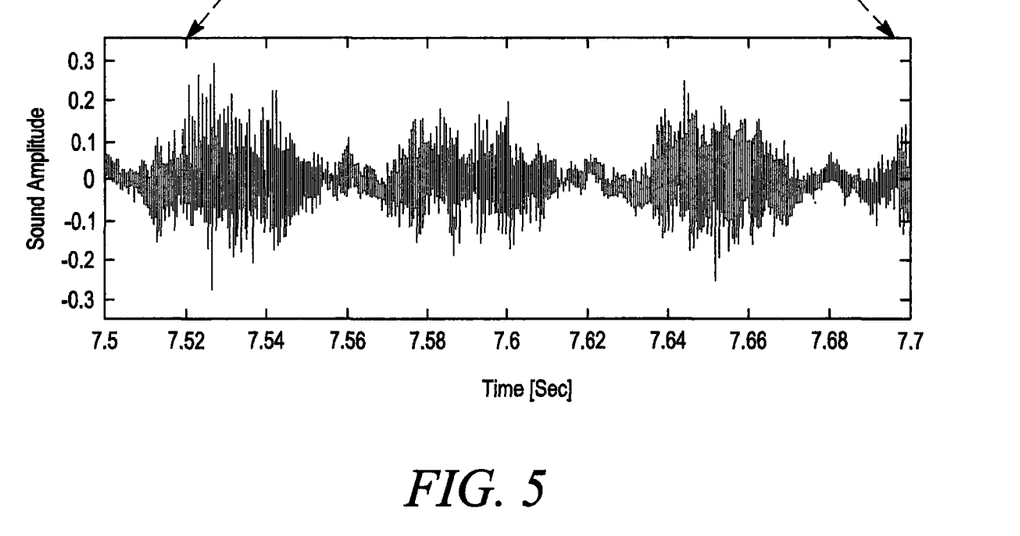
FIG. 5 is a graph of the trace of FIG. 4 over an expanded period of time.
Figure 6:
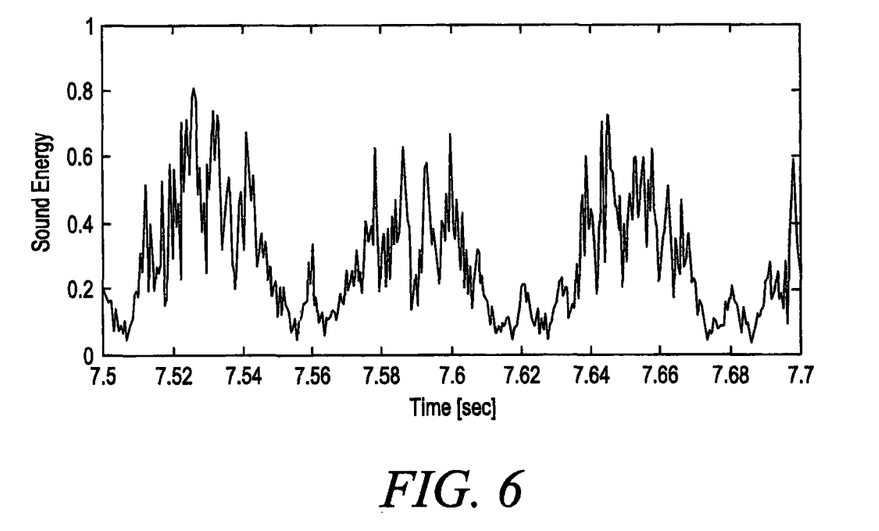
FIG. 6 shows the graph of FIG. 5 converted to sound energy.
Figure 7:
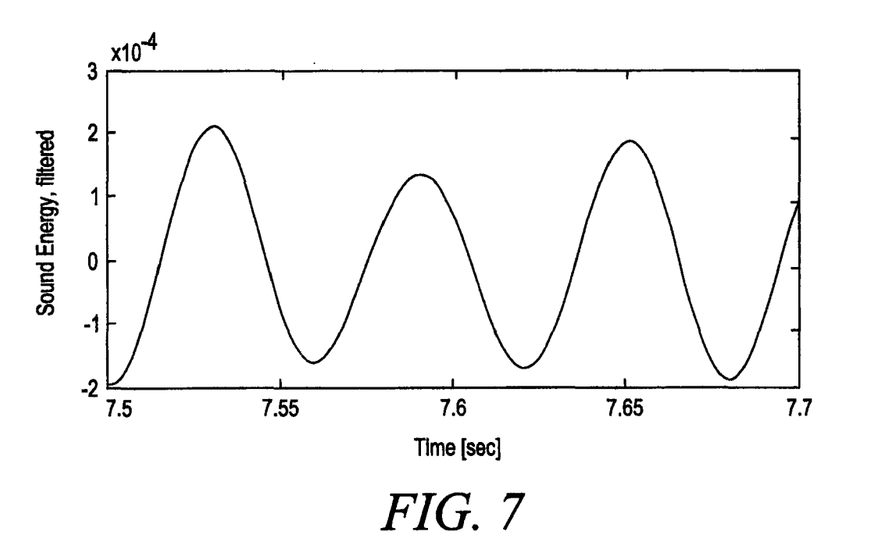
FIG. 7 shows the graph of FIG. 6 after filtering.

FIG. 4 shows the detected audio signal from the therapy device and FIG. 5 shows this signal expanded over a shorter time period. It can be seen that, although the frequency or pitch pattern is identifiable it is confused by the high frequency signal overlaid on top of this. FIG. 6 shows the effect of converting the expanded signal from simple amplitude into sound energy, resulting in a much cleaner wave structure. This can then be filtered to give smooth signal with readily identifiable peaks and troughs as shown in FIG. 7.

In the algorithm equal emphasis is placed on accuracy and computational speed. For example, when implemented in C++ the algorithm can process 20 sec of audio feed in only 50 msec, which provides a factor of 400 of margin for real time processing. Even when the algorithm is run on a mobile phone or the like the margin is more than sufficient. The algorithm operates upon incremental chunks of audio data, typically a new chunk of the latest audio capture every 0.1 or 0.2 msec. The operating range of the algorithm is configured to 10-40 Hz, that is, it aims at detecting a vibration frequency in this range.

More details of the frequency detection algorithm are given below in which the term pitch is used to mean the frequency of vibration of the valve in the therapy device after removal of the additional high frequency noise.

A target range of the pitch is defined as: [flower fupper] =[10 Hz 40 Hz]

The audio signal, which comes at FS=48 kHz or 44.1 kHz, is downsampled by a factor 45 (to 980 Hz). The downsampling rate is arrived at by setting the desired pitch accuracy at 2.5% in the middle of the frequency range From the raw audio signal a smoothed version is subtracted.

The smoothed version is computed by averaging over a neighborhood equal to the length of the smallest formant frequency (this is the typical natural frequency generated within the therapy device, starting at 250 Hz and up) 176 audio sample points After the subtraction, compute the square Downsample the signal by averaging contiguous sets of 45 samples (no overlap)

This downsampled signal is referred to as the audio energy

A smoothed version of the audio energy is computed by convolving with a filter, which is a Gaussian with sigma=0.2*45*fupper/Fs. This means the FWHM of the Gaussian is 0.4 times the period of the highest pitch frequency sought. If one goes much larger, it will start to blur out the pitch signature in the upper range (40 Hz).

As chunks of audio become available, they are processed in a pipeline that keeps track of previous moving averages.

In the smoothed signal the autocorrelation is computed in an economical fashion:

Once a pitch has been detected, the next autocorrelation is computed at a location one wavelength (of the last pitch detected) ahead of the previous point A target range for the pitch is maintained so that autocorrelation computation is focused in the most likely locations The time resolution of the autocorrelation is rough in the first calculation, then finer resolution is done around the maxima Pick the argmax of the autocorrelation function, provided that the correlation is greater than 0.6:
  Update the moving average value for the pitch with the pitch corresponding to the argmax value
  Update the derivative of the moving average, in order to refine the search window at the next iteration Update a run length for pitch detection:
  The run length is initialized to 0
  Every time a pitch has been positively identified, the run length is incremented by 1, unless:
    The run length has reached a maximum, which is given by a decay rate as round(1−1/decayRate). In our case, decay rate is set to 0.8, which gives a max run rate of 5
  If from one detected autocorrelation (>0.6) value to the next, the leap exceeds the expected amount, as given by the running average value for pitch, the run rate is reduced by the equivalent number Compute the mix value a: mix=min([decayRate 1−1/runlength])

Update the moving average values for, period (1/pitch), amplitude, derivative
  MovingAve=movingAve*mix+newValue*(1−mix)

Compute pitch or frequency as: Pitch=1/(movingAvePeriod)

The pitch or frequency detection algorithm and the pitch/pressure model can be implemented in C++, using only core C++ libraries such as vector and string. When the algorithm processes the audio in incremental chunks of 0.2 sec, executes a 20 second audio sample in about 50 milliseconds. This provides a performance headroom factor of 400, which provides ample headroom for the code in a mobile phone or similar device.

From extensive experimental data it has been found that the frequency of vibration of the rocker arm 12 and valve element 11 that provides the oscillating resistance to flow is closely related in a linear fashion to pressure measured inside the air flow tube 6. This is illustrated in the graph shown in FIG. 8. Using a linear model this produces an $r^2$ of 0.886 over 9993 data points, which is a very good fit. Similar results were found to apply regardless of the setting of the resistance dial 5.

Figure 8:
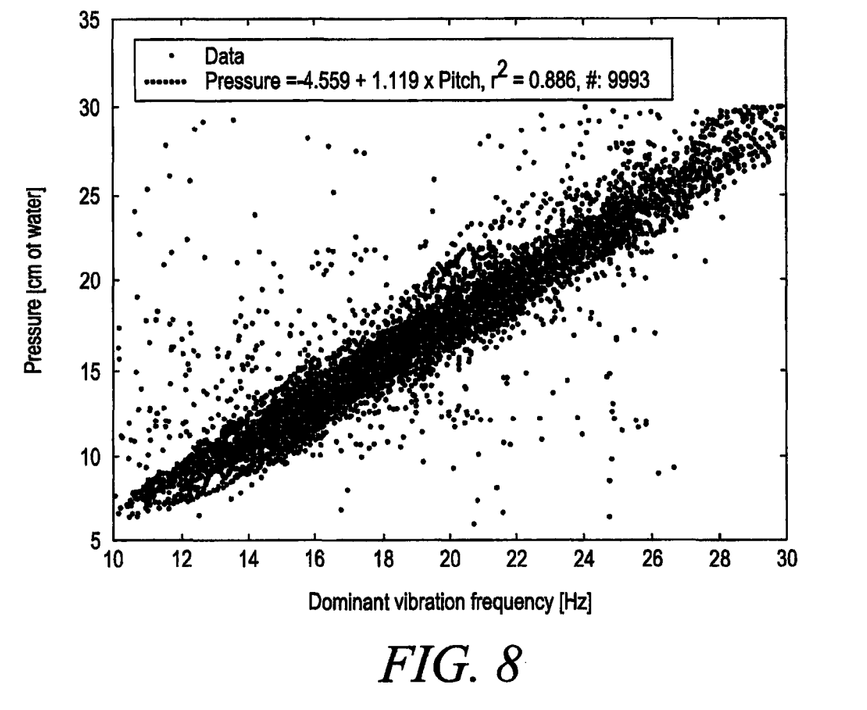
FIG. 8 is a graph illustrating the relationship between frequency and pressure.

The relationship between detected frequency and pressure can be expressed in the form:

$$P = A + B \times f$$

Where P is pressure in cm of water, f is frequency, A is a constant and B is a constant factor.

More particularly, for the respiratory therapy device 2 described above it has been found that:

$$P = -4.659 + 1.119 \times f$$

It will be appreciated that the constant and factor A and B may be different in different types of oscillatory resistance therapy devices but, in general, it is believed that the same form of relationship will exist.

The importance of this is that it means that it is possible to obtain a very close indication of the pressure within the therapy device solely from its detected frequency of operation and without the need for any dedicated pressure sensor within the device.

In this way it is possible to derive an accurate indication of pressure from an unmodified therapy device. By avoiding the need to mount a pressure sensor in the therapy device it helps keep its cost to a minimum. It also avoids the need for any electrical supply to or within the therapy device. This in turn avoids any need to make special provision to provide electrical safety isolation in the device and avoids the need for cables extending to and from the device. It also avoids the needs for batteries in the device, which can present transport safety problems, which require special measures to ensure they do not exceed a safe storage time, and which present various disposal problems.

Figure 9:
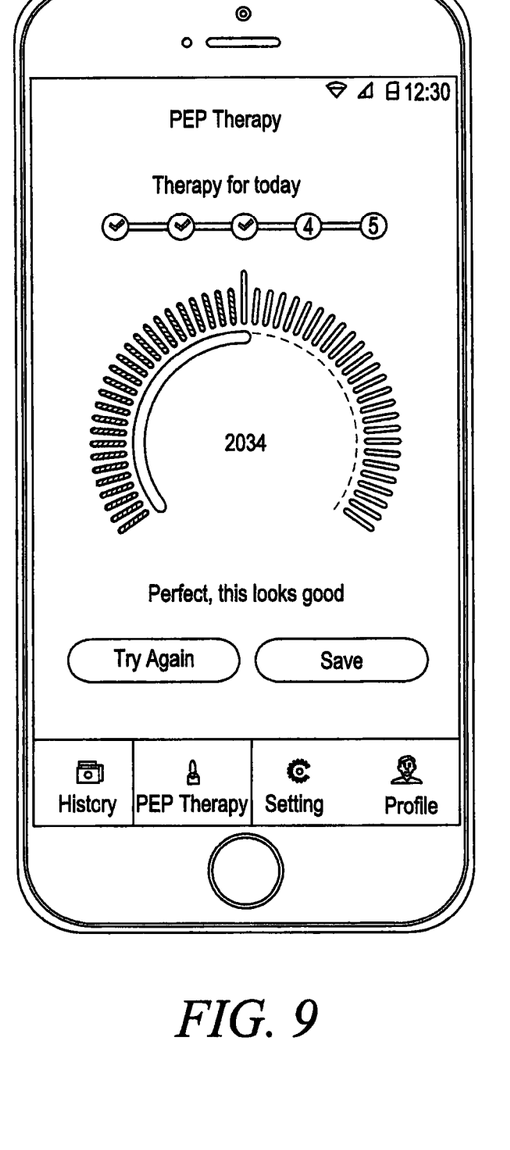
FIG. 9 shows the screen of a mobile phone during a therapy session.
Figure 10:
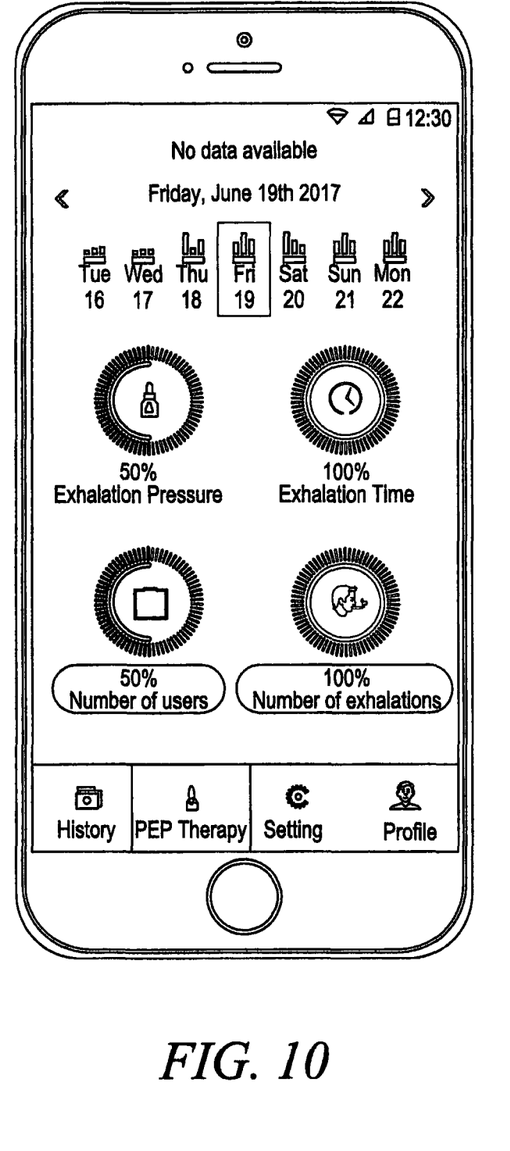
FIGS. 10 and 11 show alternative screen displays of the mobile phone after use with different representations of therapy history over a week.
Figure 11:
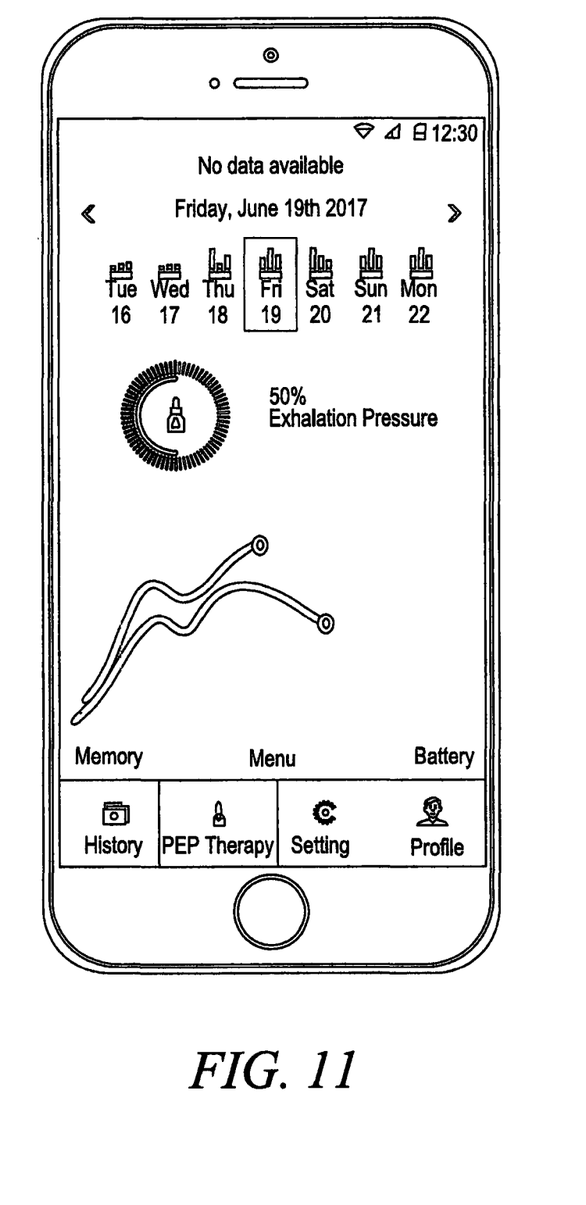

In use, the phone 20 or other sensor unit or sensor means is placed separately and remotely from the device 100 but sufficiently close to the device to be within the audible range of the microphone 21; the sensor unit need not be in direct contact with the device. The therapy monitor app in the phone 20 is located and started. When the user starts the therapy session the device 100 starts to emit audible sounds that produce pressure waves that are picked up by the microphone 21 in the phone 20. The processor 22 in the phone 20 carries out the frequency detection algorithm to identify a frequency value and then uses this in the expression: P=−4.659+1.119×f to derive a measure of the pressure in cm of water. This measure of pressure is compared with preprogramed pressure values stored in the processor 22 representative of target values and limits appropriate for the particular user. The pressure is then displayed on the screen 24 of the phone 20, during a therapy session, in a combination of numerical and graphical representations as illustrated in FIG. 9. Typically the pressure is represented along a scale with different colours indicating that the pressure is too low, too high or correct. After the conclusion of the therapy session the phone screen 24 switches to display a therapy history. Two different alternative history representations are illustrated in FIGS. 10 and 11, showing typically the average exhalation pressure, the exhalation time, the number of uses over a period (such as each week) and the number of exhalations during the therapy session.

As mentioned above, the setting of the dial 5 on the therapy device 100 affects the frequency and resistance to flow through the device. This is set by the user to achieve the maximum beneficial effect. The app in the phone 20 could be arranged to receive a manual input of the dial setting by the user or clinician.

The sensor means described above is provided by a program or app in the mobile phone 20 but it could, instead, be provided by a dedicated sensor unit with a suitably programmed processor. Such a sensor unit could be mounted with the therapy device, such as by means of a clip or strap that supports the sensor on the device. The sensor means could be provided by a multifunction unit such as provided by program application in a general purpose computer, using the microphone built in the computer, or a separate plug-in microphone. The program application could be arranged to stop automatically after the elapse of a predetermined time without sensing any sound of the characteristic frequencies.

It will be appreciated that there are many different ways in which information obtained by the sensor unit can be represented so that it is provided to the user and clinician in the most useful manner.

Apparatus of the present invention can be used with any conventional respiratory therapy apparatus that produces a sound signal. The therapy apparatus may be combined with other treatments such as nebulisation or the administration of aerosol medication.

The present invention enables someone using an existing, conventional therapy device to be provided with useful data about its use. In this way, the user can be made more aware of how well he is complying with the prescribed therapy programme and can modify his use of the device accordingly to achieve maximum benefit. The clinician is also able to check patient compliance so that he can identify whether any deterioration in a patient's condition is due to lack of compliance or if alternative treatment is needed.

The invention claimed is:

1. Respiratory therapy apparatus including a device arranged to provide an alternating resistance to respiratory flow through the device and a sensor unit arranged to sense sound made by the device in response to expiration breathing from a user into the device, wherein the sensor unit comprises a processor arranged to compute a measure of pressure created in the device by converting the sound sensed by the sensor unit into a sound energy signal having a frequency, and by multiplying the frequency by a fixed factor to provide a product and adding to the product a fixed constant to compute the measure of pressure, wherein the computed measure of pressure is compared with preprogrammed pressure values stored in the processor representative of target values and limits appropriate for the user, and wherein the measure of pressure is displayed on a screen so that the user is made aware of how well the user is doing with the user's expiration breathing into the device and whether the user needs to modify the user's expiration breathing to achieve maximum benefit from the use of the device.

2. The respiratory therapy apparatus according to claim 1, wherein the fixed factor is about 1.119.

3. The respiratory therapy apparatus according to claim 1, wherein the fixed constant is about −4.659.

4. The respiratory therapy apparatus according to claim 1, wherein the sensor unit includes a microphone responsive to audible sound.

5. The respiratory therapy apparatus according to claim 1, wherein the device includes a valve element on a rocker arm that opens and closes an opening during exhalation through the device to generate the sound sensed by the sensor unit.

6. The respiratory therapy apparatus according to claim 1, wherein the sensor unit is not mounted on the device but is separate from the device.

7. The respiratory therapy apparatus according to claim 6, wherein the sensor unit is provided by a mobile phone including a microphone and a screen, and that the processor is also provided by the mobile phone.

8. A sensor unit arranged to sense sound made by a respiratory therapy device, wherein the sensor unit includes a processor arranged to compute a measure of pressure created in the device by converting the sound sensed by the sensor unit into a sound energy signal having a frequency and to use the frequency of the sound energy signal to compute the measure of pressure in the device.

9. The sensor unit according to claim 8, wherein the sound is generated by the device providing an alternating resistance to respiratory flow through the device.

10. A method of evaluating use of a respiratory therapy device arranged to produce an oscillating resistance to breathing through the device, the method comprising:
utilizing a sensor unit for sensing sound within the device due to pressure in the device caused by expiration breathing from a user into the device;
utilizing a processor working cooperatively with the sensor unit for converting the sound sensed by the sensor unit into a sound energy signal having a frequency, and calculating a measure of the pressure within the device from the frequency of the sound energy signal;
comparing the computed measure of pressure with preprogrammed pressure values stored in the processor representative of target values and limits appropriate for the user;
displaying the measure of pressure to the user so that the user is made aware of how well the user is doing with the user's expiration breathing and whether the user needs to modify the user's expiration breathing to achieve maximum benefit from the use of the device.

11. The method according to claim 10, wherein the measure of the pressure is computed by multiplying the frequency by a fixed factor and adding to the product a fixed constant.

12. The method according to claim 11, wherein the fixed factor is about 1.119 and the fixed constant is about −4.659.

* * * * *